C. Shunk.
Refining Iron.
No. 2,118.
Reissued Nov. 28, 1865.
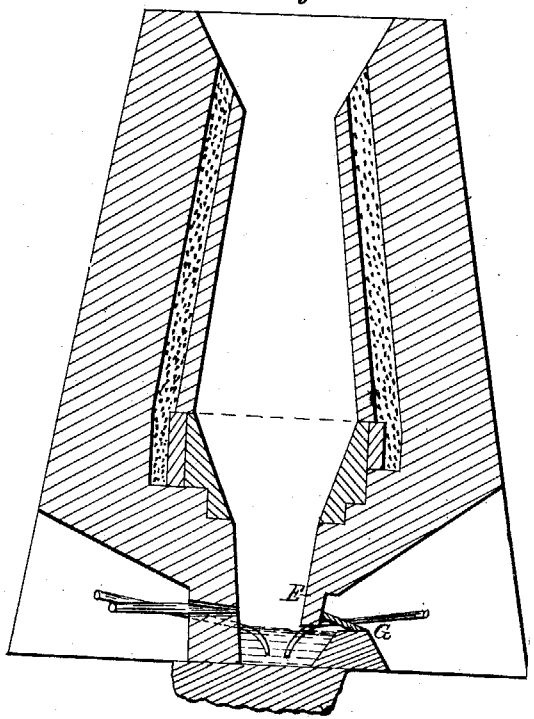
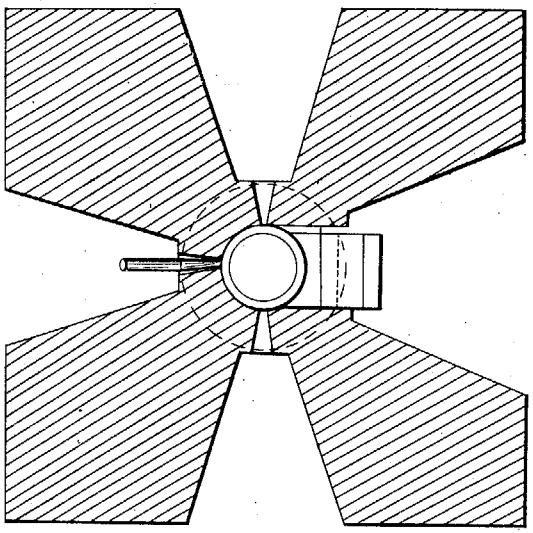
Witnesses:
Edward H. Knight
Charles D. Smith
Inventor:
C. Shunk

UNITED STATES PATENT OFFICE.

CHRISTIAN SHUNK, OF YOUNGSTOWN, OHIO.

IMPROVEMENT IN REFINING IRON.

Specification forming part of Letters Patent No. 14,257, dated February 12, 1856; Reissue No. 1,686, dated May 31, 1864; Reissue No. 2,118, dated November 28, 1865.

*To all whom it may concern:*

Be it known that I, CHRISTIAN SHUNK, formerly of Armstrong county, Pennsylvania, now of Youngstown, Mahoning county, Ohio, have discovered and invented a new and useful process and improvement for refining molten crude iron from the ore or the remelted pig-metal by the employment and application of compressed air forced in, which has for effect the decarbonizing or partially decarbonizing the same and rendering it fit to mold into ingots for hammering or rolling, and the use of common salt as a flux for separating the impurities from the crude iron, as herein described, and the same being grounded on my application filed in the Patent Office the 28th day of August, 1854, and for which a patent was granted the 12th day of February, 1856, for a part only of said application of August 28, 1854, and the same having been subsequently reissued under a renewed petition and statement filed on the 31st day of May, 1864, and embracing my original application of August, 1854, and with the accompanying statement and affidavit explanatory thereto, and with renewed petition herewith annexed.

Iron ores and mineral coal contain foreign substances which require to be expelled in the process of manufacture or in the process of refining and decarbonizing the crude iron with air-blast, and which is effected by the use of fluxes or the proper calcination of the ores. By making the smelting-furnace widest at the top or tunnel-head it affords a larger outer surface, and therefore a longer time at the entrance of the furnace-stack, and thereby a more perfect calcination of the ores is effected before they descend to the smelting-point below, and also a free escape of the impurities contained in the minerals. Three quarts of the dry salt is sufficient to flux one ton of crude iron. The salt can be introduced into the furnace-hearth through one of the tuyere-pipes by the force and pressure of the blast, or it can be used in the refining apparatus hereinafter described, at the time the refining and decarbonizing process is commenced. I am aware that the use of common salt has been attempted before in some forms of the iron business, but not to my knowledge in the manner and for the purposes used by me.

Crude pig metal of gray quality contains about five per cent. of carbon, which requires to be reduced by decarbonization for converting into ingots for forging purposes, and when in a fluid state the carbon freely combines with the oxygen of the air, forming carbonic gas, and increased heat is obtained, and the refining and conversion of the crude iron is effected by the agency of its own carbon combining with the air forced in, and yielding the different grades of refined iron or steel, or refined semi-steel, or malleable iron, owing to the time the blast is continued.

Refined iron or steel is of different degrees of hardness and quality, according to the amount of carbon it contains in a combined state—from three-fourths of one per cent. to one and a half per cent. Common bar iron contains but a trace of carbon.

My decarbonizing process can be applied at the blast-furnace hearth after a deposit of metal has accumulated, but it is preferable to use a separate refining fire or apparatus, placed a convenient distance to the furnace-hearth for the operation of decarbonizing the crude molten iron by compressed-air blast, the form of which is not particularly essential, and which is readily suggested by any practical iron-worker, and is made of cast or wrought iron plates, lined with the best quality of fire-brick or pure soap-stone, or any substance that will resist the heat, and made round or the shape and size desired, and of sufficient height to allow room for the metal to rise, which it does during the refining process, and should not be made quite half full when the blast is let in. The air can be introduced in different modes, but it is preferable to force the blast in at about half the depth of the molten metal, by attaching the tuyere-pipes or apertures for the passage of the blast through the side of the converting fire, so that the air will penetrate the body of the molten metal to effect the process of decarbonization. When the blast is let in the full quantity of metal is not necessary, but can be increased while the decarbonizing and converting process is going on to the amount and kind desired. The process then consists in starting an air-blast under high pressure into the mass of molten iron, which at once kindles a blaze, occasioned by the oxygen consuming a portion of the carbon from the crude metal, and by which the workman derives a clue as to the progress of combustion and the kind of yield, and which is readily distinguished by the flame developed—first, when the flame commences to decrease the product is that of refined iron or steel, but when the flame is about to cease the product will be refined metal in a low state of semi-steel, containing less carbon than the former kind.

The refined metal is tapped by removing a stopper, or a properly-arranged gate or valve can be attached for the discharge of the refined metal, and which is then molded into ingots fit for rolling or forging purposes. If it is intended to blow the metal into a mass of refined malleable iron, by reducing the carbon, for the purpose of forming balls to make blooms, the refining fire or apparatus is made with a door or opening for the use of the workman's bar, which any practical iron-worker will readily understand.

Twelve hundred cubic feet of air per minute discharged under a pressure of ten pounds will convert one ton of crude iron in eight to ten minutes. The aggregate pipe section or apertures for discharging the stated amount of blast is three square inches. Before the metal is tapped to mold into ingots it is allowed to stand some minutes after the blast is let off for the metal to cease boiling and the dross to rise to the surface.

It has already been stated that it is preferable to use a separate refining fire or converting apparatus. I will describe how the decarbonizing can be done in the blast-furnace hearth. The tuyere pipe or pipes are introduced at one of the tuyere-arches, or in front under the temp-stone E, through an aperture in the dam-plate G, and of sufficient length to dip down into the molten metal for the discharge of the air-blast.

The refining tuyere-pipes or apertures to force the air through are made of black lead or pure soapstone or any substance that will resist the heat.

In the construction of the refining apparatus for converting molten metal with air-blast I do not confine myself to any specified form or details of the same, nor to any specified mode of introducing the blast therein to effect my decarbonizing process. Refining pig metal by the use of fuel to support combustion for puddling purposes to make bar-iron has been known before.

What I claim as my invention and discovery, and for which I ask Letters Patent, is—

The refining of molten crude iron from the ore or the remelted pig metal by the employment and the application of compressed air forced in combining with the carbon of the crude metal, and thereby decarbonizing or partially decarbonizing the same and rendering it fit to mold into ingots or into a mass of malleable refinediron to make blooms for forging or rolling purposes, and the use of common salt as a flux. These claims I make jointly and separately.

CHRISTIAN SHUNK.

Attest:
N. W. McKEOWN,
S. W. McKEOWN.